(12) United States Patent
Cahouet et al.

(10) Patent No.: US 10,421,163 B2
(45) Date of Patent: Sep. 24, 2019

(54) ASSEMBLY FOR INSERTING A THERMOCOUPLE INTO A TUBULAR PIPE AND CORRESPONDING METHOD

(71) Applicant: AREVA NP, Courbevoie (FR)

(72) Inventors: Laurent Cahouet, Chaudenay (FR); Christophe Parize, Jambles (FR); Alain Scalvini, Ouroux sur Saone (FR)

(73) Assignee: AREVA NP, Courbevoie (FR)

( * ) Notice: Subject to any disclaimer, the term of this patent is extended or adjusted under 35 U.S.C. 154(b) by 157 days.

(21) Appl. No.: 15/564,399

(22) PCT Filed: Apr. 4, 2016

(86) PCT No.: PCT/EP2016/057338
§ 371 (c)(1),
(2) Date: Oct. 4, 2017

(87) PCT Pub. No.: WO2016/162303
PCT Pub. Date: Oct. 13, 2016

(65) Prior Publication Data
US 2018/0133852 A1    May 17, 2018

(30) Foreign Application Priority Data
Apr. 8, 2015    (FR) .................................... 15 53016

(51) Int. Cl.
*G01K 1/14*    (2006.01)
*B23P 19/02*    (2006.01)
*G01K 7/02*    (2006.01)

(52) U.S. Cl.
CPC ............. *B23P 19/022* (2013.01); *G01K 1/14* (2013.01); *G01K 7/02* (2013.01)

(58) Field of Classification Search
CPC ..................................................... G01K 1/146
See application file for complete search history.

(56) References Cited

U.S. PATENT DOCUMENTS

| 3,090,233 A | 5/1963 | Shields et al. |
| 4,595,300 A | 6/1986 | Kaufman |
| 5,813,658 A * | 9/1998 | Kaminski .............. B65H 51/14 254/134.4 |

(Continued)

FOREIGN PATENT DOCUMENTS

| FR | 2637527 A1 | 4/1990 |
| JP | H 07294341 A | 11/1995 |

OTHER PUBLICATIONS

Corresponding PCT International Search Report.

*Primary Examiner* — Clayton E. LaBalle
*Assistant Examiner* — Leon W Rhodes, Jr.
(74) *Attorney, Agent, or Firm* — Davidson, Davidson & Kappel, LLC

(57) ABSTRACT

An insertion assembly (1) includes a frame (11), having a longitudinal passage (13) for the thermocouple (3); a device (15) for blocking the pipe (5) in position relative to the frame (11); a device (17) for guiding the thermocouple along the passage (13); and a device (19) for driving the thermocouple (3). The driving device (19) includes at least a first drive belt (21) having a first longitudinal segment (25) pressed against the thermocouple (3), and a motor member driving said first segment (25) of the first belt (21) longitudinally relative to the frame (11).

11 Claims, 5 Drawing Sheets

(56) References Cited

U.S. PATENT DOCUMENTS

| | | | |
|---|---|---|---|
| 6,484,920 B1 * | 11/2002 | Selcer | B65H 51/14 226/172 |
| 8,278,599 B2 * | 10/2012 | Patterson | B65H 51/14 219/136 |
| 8,485,010 B1 | 7/2013 | Francis | |

* cited by examiner

ASSEMBLY FOR INSERTING A THERMOCOUPLE INTO A TUBULAR PIPE AND CORRESPONDING METHOD

The invention generally relates to the insertion of thermocouples into tubular pipes.

More specifically, according to a first aspect, the invention relates to an assembly for inserting a thermocouple into a tubular pipe, of the type comprising:
- a frame, having a longitudinal passage for the thermocouple;
- a device for blocking the pipe in position relative to the frame;
- a device for guiding the thermocouple along the passage to an opening at the end of the pipe;
- a device for driving the thermocouple longitudinally along the passage relative to the frame.

BACKGROUND

U.S. Pat. No. 8,485,010 describe such an insertion assembly. The driving device comprises two pairs of rollers, the rollers of each pair pinching the thermocouple between them. Such an assembly has the flaw of marking the thermocouple, due to the pressure exerted by the rollers.

SUMMARY OF THE INVENTION

In this context, an assembly is provided that does not mark the thermocouple.

To that end, an assembly of the aforementioned type is provided, characterized in that the driving device comprises at least a first drive belt having a first longitudinal segment pressed against the thermocouple, and a motor member driving said first segment of the first belt longitudinally relative to the frame.

The use of a belt in place of rollers makes it possible to increase the contact surface with the thermocouple. This makes it possible to have a higher pinching force, without marking the outer surface of the thermocouple. Embodiments of invention also make it possible to overcome resistance to the forward movement of the thermocouple much higher than in U.S. Pat. No. 8,485,010.

The assembly may also have one or more of the features below, considered individually or according to any technically possible combinations:
- the driving device comprises a second drive belt having a second longitudinal segment pressed against the thermocouple, the motor member driving said second segment of the second belt longitudinally relative to the frame, the first and second segments being arranged transversely on either side of the thermocouple and pinching the thermocouple between them;
- the driving device comprises, for each of the first and second belts, a driving pulley and a follower pulley longitudinally separated from one another, the first and second belts each being stretched around two corresponding pulleys and each circulating around two corresponding pulleys;
- the driving device comprises, for each of the first and second belts, a pinion and a kinematic drive chain of the corresponding drive pulley by the pinion, the pinions meshing with one another;
- the driving device comprises, for each of the first and second belts, a belt pad arranged between the driving pulley and the follower pulley, arranged so as to stress the first or second belt transversely against the thermocouple;
- the frame comprises two half-frames respectively bearing the first and second belts, the two half-frames being movable relative to one another transversely, between a usage position in which the first and second belts transversely pinch the thermocouple between them, and an idle position in which the first and second belts are relatively more separated from one another than in the usage position and allow the placement of the thermocouple between the first and second belts;
- the assembly comprises guide members, guiding the two half-frames in a translational movement between the idle position and the usage position;
- the assembly comprises a gripping device to stress the two half-frames against one another in the usage position;
- the device for blocking the pipe in position relative to the frame comprises two gripping pads each supported by a half-frame, suitable for pinching the pipe between them in the usage position of the two half-frames and releasing the pipe relative to the frame in the idle position of the half-frames; and
- the device for guiding the thermocouple along the passage comprises at least two centering pads each supported by a half-frame, suitable for centering the thermocouple relative to the passage in a plane perpendicular to the longitudinal direction in the usage position of the half-frames and for allowing the thermocouple to be placed in the passage in the idle position of the half-frames.

According to a second aspect, a method is provided for inserting a thermocouple into a tubular pipe using an assembly having the above characteristics:
- placing the half-frames in the idle position;
- placing the thermocouple and the pipe relative to the half-frames;
- placing the half-frames in the usage position;
- activating the motor member.

BRIEF SUMMARY OF THE DRAWINGS

Other features and advantages of the invention will emerge from the following detailed description, provided for information and non-limitingly, in reference to the appended figures, in which.

DETAILED DESCRIPTION

The assembly 1 shown in the figures is intended for the insertion of a thermocouple 3 into a tubular pipe 5. It is more particularly intended to be used in a nuclear power plant. Indeed, nuclear reactors generally include instrumentation columns, equipped with thermocouples making it possible to measure the temperature of the primary liquid inside the vessel of the reactor. The tubular pipes intended to receive these thermocouples are connected to the cover of the vessel, and traverse this cover. The opening of the pipe allowing the insertion of the thermocouple is situated above the cover, outside the vessel.

The thermocouples must be replaced periodically. To do this, the used thermocouple is removed from the tubular pipe 5, and a new thermocouple 3 is inserted into the tubular pipe 5, through the opening.

This operation is done either with the cover in place on the vessel, or with the cover disassembled and the vessel's insides placed on a stand at the bottom of the pool.

Figure 1:
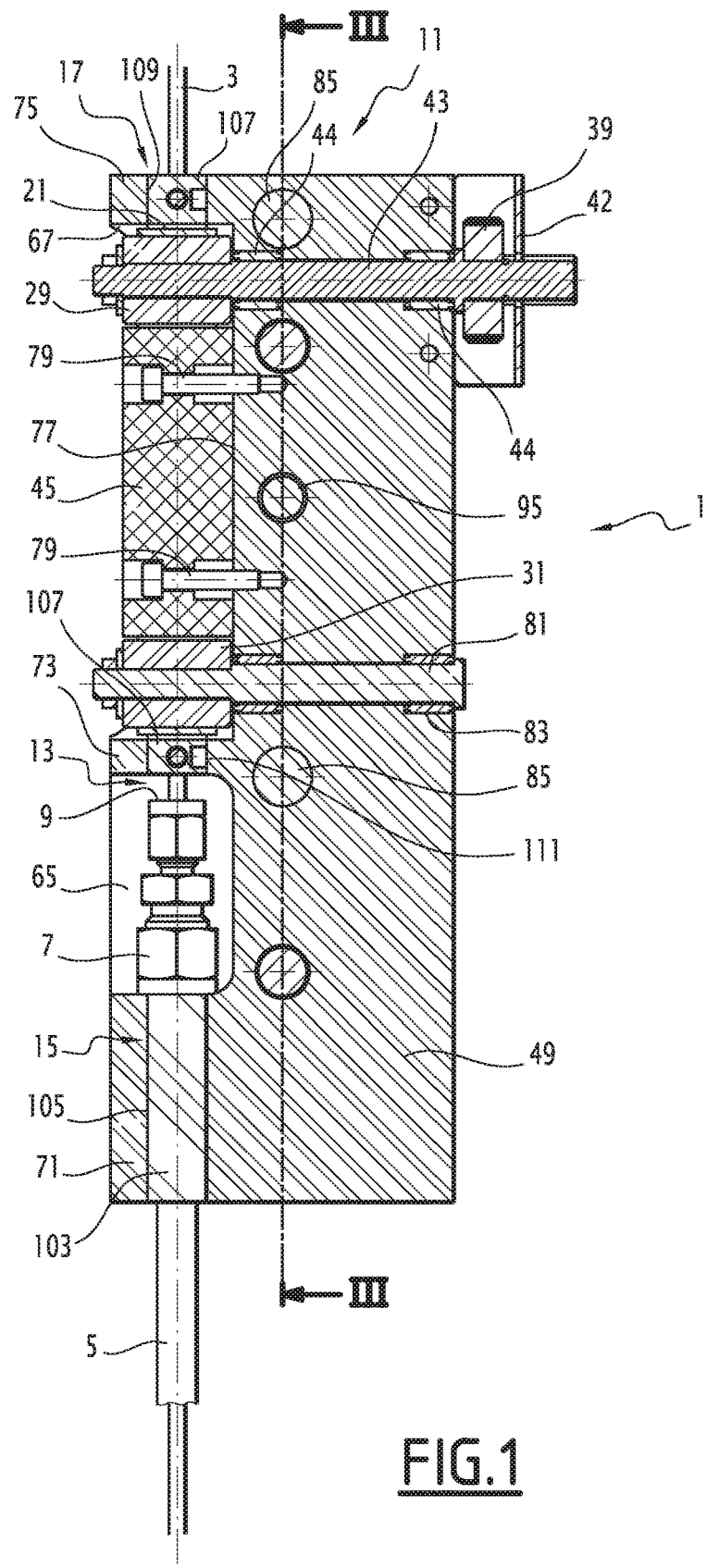
FIG. 1 is a sectional view of the insertion assembly according to an embodiment of the invention, considered along the incidence of arrows I in FIG. 2.

As shown in particular in FIG. 1, the pipe 5 bears, at its end, a coupling 7, inwardly defining the opening 9 for insertion of the thermocouple 3 into the pipe 5. The pipe 5 and the coupling 7 are made from metal.

The thermocouple 3 is a metal wire with a small diameter, for example made from stainless steel, having a diameter comprised of about 3 mm.

The assembly 1 is provided to push the thermocouple 3 to the inside of the tubular pipe 5, through the opening 9. The thermocouple 3 has a substantial length, of several meters.

To insert the thermocouple, it is necessary to overcome the holding power of the thermocouple 3 inside the pipe 5. Furthermore, when the insertion movement of the thermocouple 3 into the pipe 5 is temporarily interrupted, it is necessary, in order to restart the movement, to overcome the adhesion of the thermocouple to the pipe.

The insertion operation of the thermocouple 3 into the pipe 5 is therefore a delicate operation, which must preferably be done without stopping.

Figure 2:
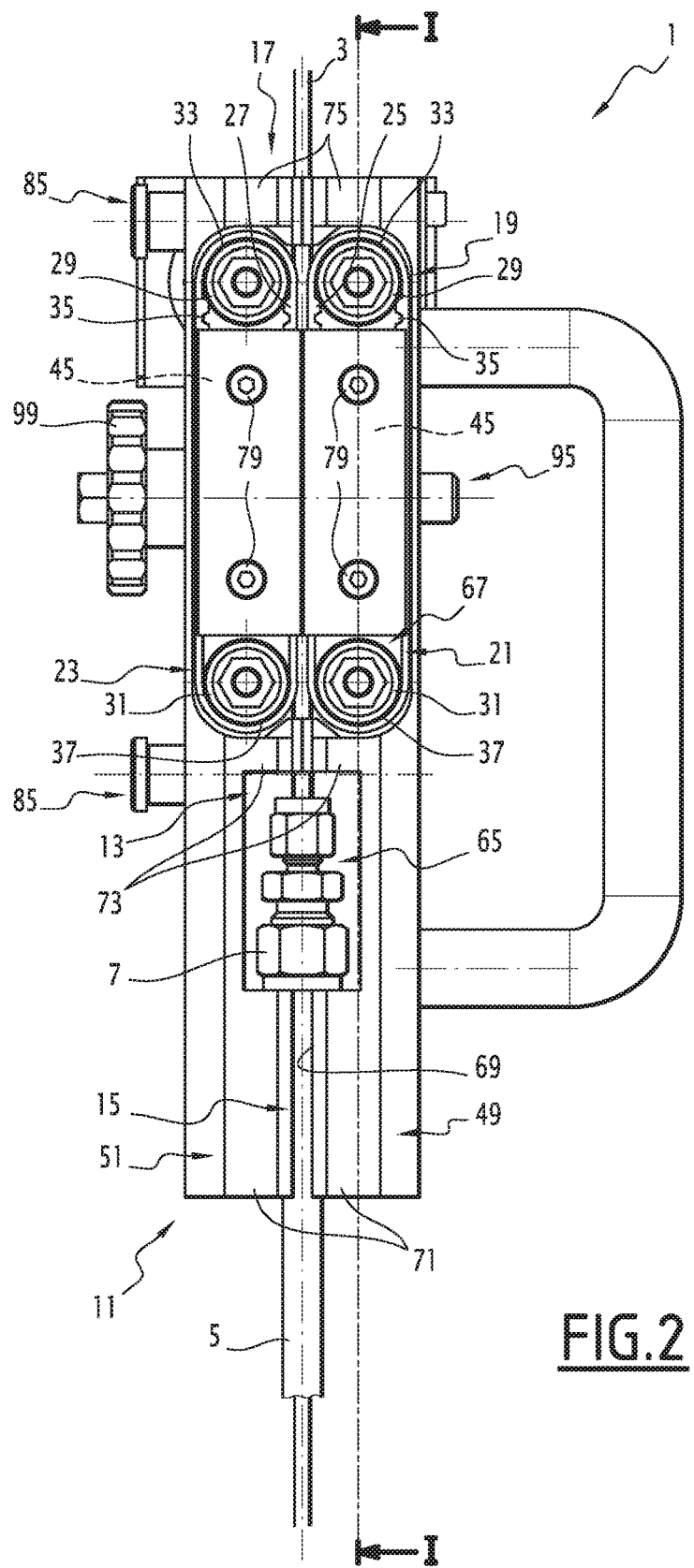
FIG. 2 is a front view of the assembly of FIG. 1.
Figure 3:
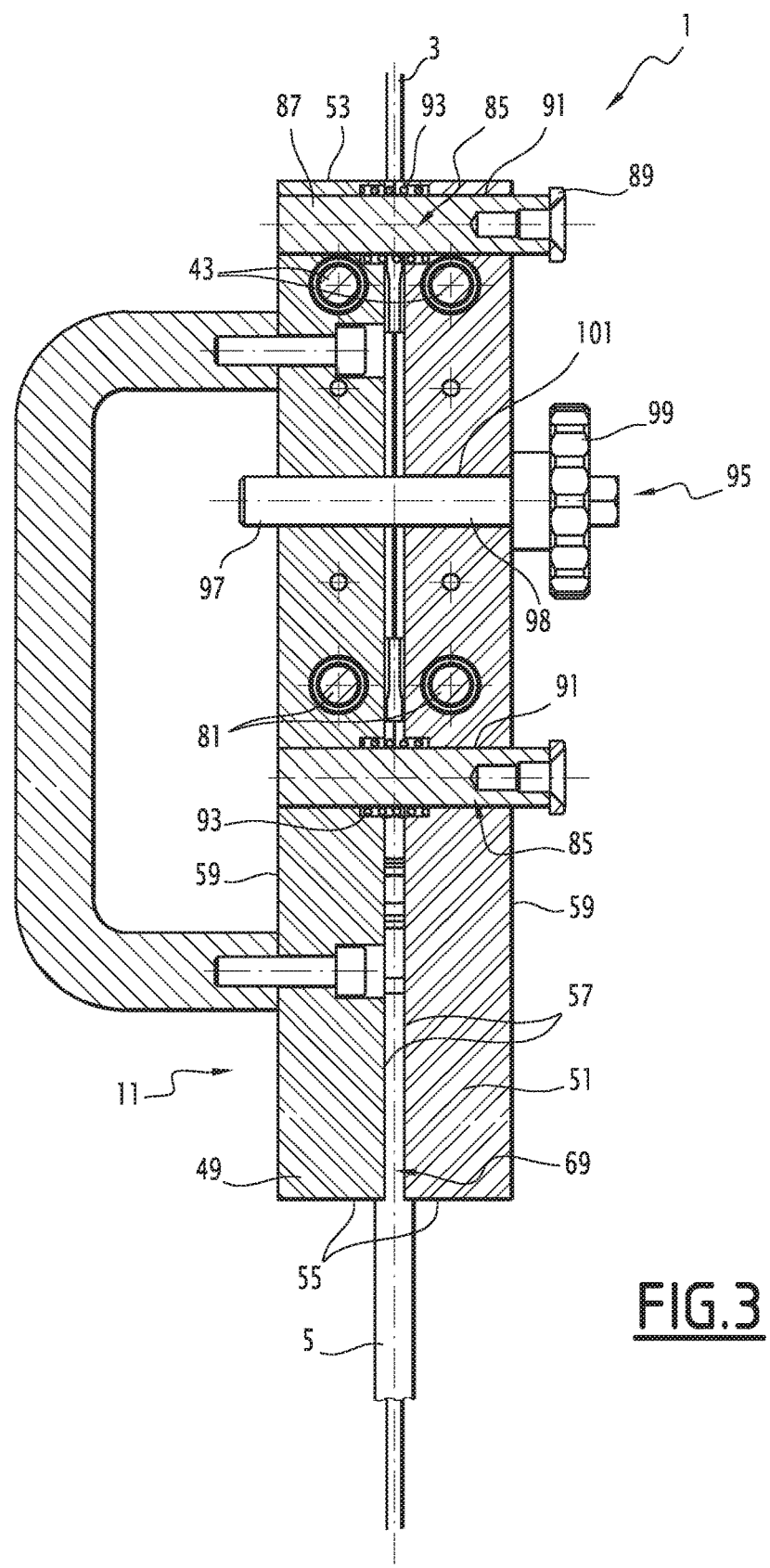
FIG. 3 is a sectional view of the assembly of FIG. 1, considered along the incidence of arrows III in FIG. 1.

As shown in particular in FIGS. 1 and 2, the assembly 1 comprises:
- a frame 11, having a longitudinal passage 13 for the thermocouple 3;
- a block in the form of a device 15 for blocking the pipe 5 in position relative to the frame 11;
- a guide in the form of a device 17 for guiding the thermocouple along the passage to the opening 9 at the end of the pipe 5;
- a drive in the form of a device 19 for driving the thermocouple 3 longitudinally along the passage 13 relative to the frame 11.

The driving device 19 comprises first and second drive belts 21 and 23, respectively having first and second longitudinal segments 25, 27 pressed against the thermocouple 3 (FIG. 2). The first and second segments 25, 27 are arranged transversely, on either side of the thermocouple 3, and transversely pinch the thermocouple 3 between them. The transverse direction is perpendicular to the longitudinal direction along which the thermocouple moves.

Furthermore, the driving device 19 includes a motor member driving the first and second segments 25, 27 longitudinally relative to the frame. The first and second segments 25, 27 together exert a force on the thermocouple sufficient to drive the thermocouple and insert it inside the pipe 5. This force is sufficient to overcome not only the holding power of the thermocouple 3 inside the sheath 5, but also the adhesional force between the thermocouple 3 and the pipe 5.

The intensity of the driving force depends on several factors: the longitudinal length of the segments 25 and 27, the nature of the material making up the belts 21 and 23, the force with which the first and second segments 25, 27 pinch the thermocouple 3 between them.

According to one non-preferred alternative, the driving device includes only one drive belt, the second drive belt being replaced by a guide surface that is stationary relative to the frame.

As shown in particular in FIG. 2, the driving device comprises, for each of the first and second belts 21, 23, a drive pulley 29 and a follower pulley 31 separated longitudinally from one another. Each of the pulleys is mounted rotating on the frame, around a rotation axis substantially perpendicular to the longitudinal direction and substantially perpendicular to the transverse direction.

The first and second belts 21, 23 are each stretched around the drive pulley and the follower pulley that are dedicated to it. Each of the belts circulates around the drive pulley and the follower pulley that are dedicated to it.

Thus, the first belt 21, once mounted around the pulleys, has a rounded segment 33 pressed against an outer surface of the drive pulley 29, a longitudinal segment 35 extending from the drive pulley 29 to the follower pulley 31 and turned away from the thermocouple, another rounded segment 37 winding around an outer surface of the follower pulley 31, the first longitudinal segment 25 extending between the drive pulley 29 and the follower pulley 31 longitudinally, and being turned toward the thermocouple. As shown in FIG. 2, the inner face of the first belt 21 is notched, so as to cooperate with teeth arranged on the outer surface of the drive pulley 29 and the follower pulley 31.

The second belt 23 is arranged in the same way around the drive pulley 29 and the follower pulley 31 specific to it.

As shown in particular in FIG. 1, the driving device 19 also comprises a pinion for each of the first and second belts 21, 23, and a kinematic chain for driving of the drive pulley 29 by the pinion. The pinions associated with the first and second belts are respectively referenced 39 and 41.

In the illustrated example, the kinematic chain is reduced to its simplest expression, and is an axle 43 rigidly fastened by one end to the drive pulley 29, and by its opposite end to the pinion 39, 41. The axle 43 is mounted rotating on the frame 11 via bearings 45. The pinions 39, 41 mesh with one another. Furthermore, one of the two pinions is rotated around the axle 43 by the motor member.

Thus, the pinions 39 and 41 have opposite directions of rotation, such that the drive pulleys 29 of the two belts 21, 23 also have opposite directions of rotation. Due to the arrangement of the first and second segments 25, 27 on either side of the thermocouple 3, the first and second segments 25, 27 therefore move longitudinally in the same direction.

Figure 5:
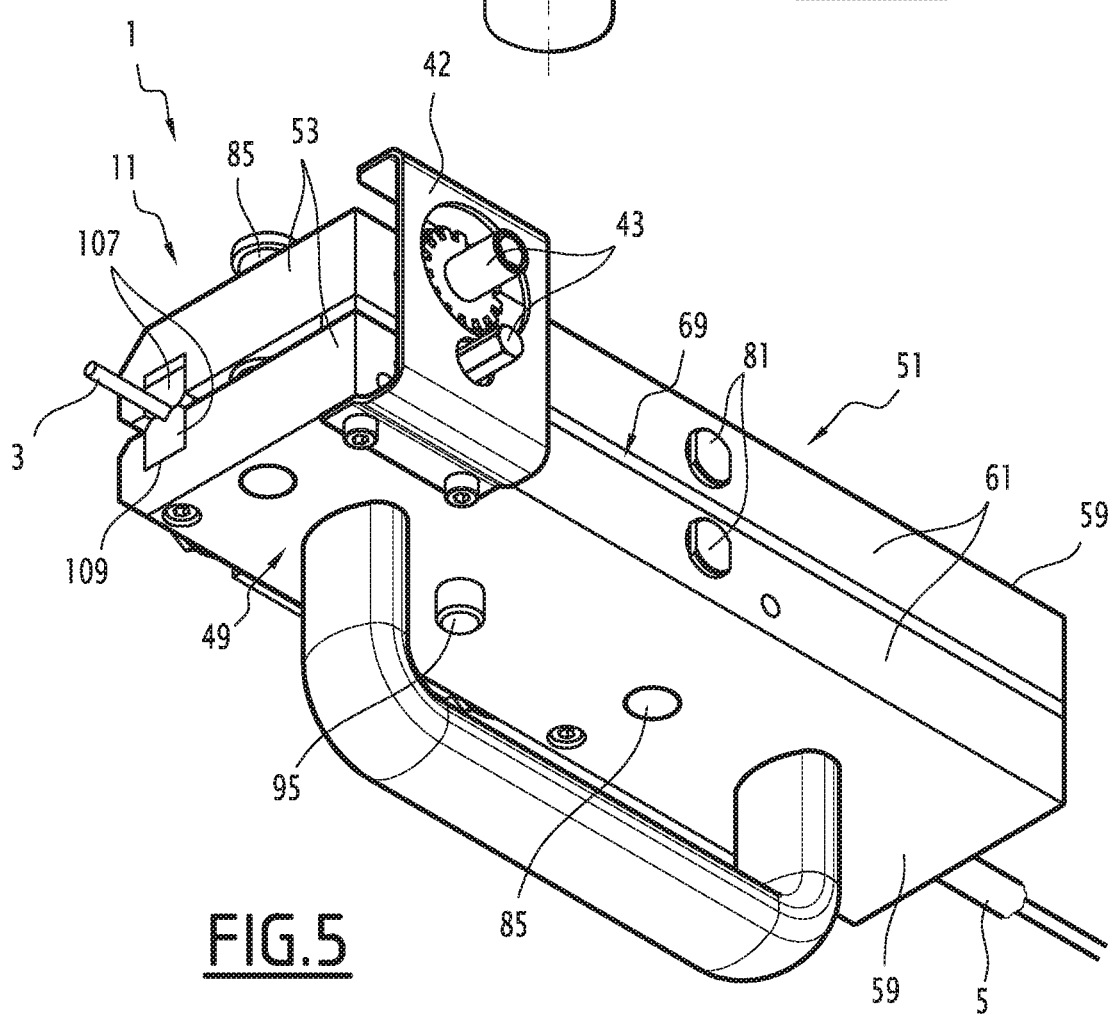
FIGS. 5 and 6 are perspective views of the assembly of FIG. 1.
Figure 6:
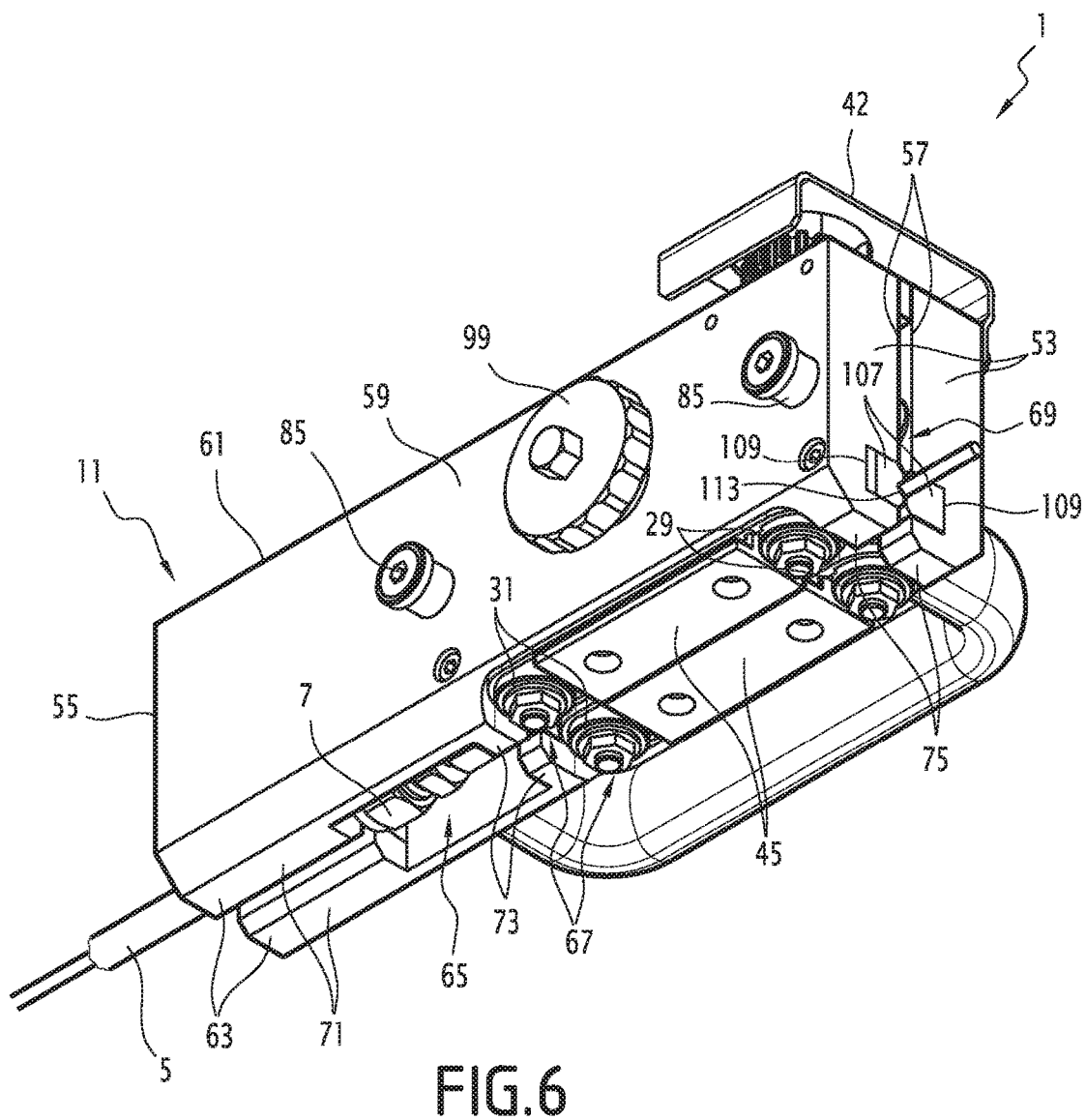

As shown in FIGS. 5 and 6, the pinions 39 and 41 are protected by covers 42.

Furthermore, as shown in FIG. 1, the driving device 19 includes, for each of the first and second belts 21, 23, a belt pad 45 arranged between the drive pulley 29 and the follower pulley 31. This pad 45 typically occupies substantially the entire space from one pulley to the other longitudinally, and transversely from the segment 35 to the segment 25 or 27. It is thus arranged so as to transversely stress the first or second belt 21, 23 against the thermocouple 3, and more specifically the first or second longitudinal segment 25, 27 against the thermocouple 3.

Thus, the first and second segments 25, 27 are pressed over their entire longitudinal length against the thermocouple 3.

This makes it possible to distribute the transverse force exerted by the belts over a significant length of the thermocouple 3, and contributes to the absence of marking of the thermocouple.

As shown in particular in FIGS. 4 to 7, the frame 11 comprises two half-frames 49, 51, respectively bearing the first and second belts 21, 23.

The two half-frames 49, 51 are movable relative to one another transversely, between a usage position shown in the figures in which the first and second belts 21, 23 transversely pinch the thermocouple 3 between them, and an idle position in which the first and second belts are relatively more separated from one another than in the usage position and allow the placement of the thermocouple 3 between 5 the first and second belts 21, 23.

The half-frames 49, 51 are solid parts, for example made from aluminum.

Each of the half-frames 49, 51 bears, aside from the first or second belt 21, 23, the corresponding drive pulley 29 and follower pulley 31, the pinion 39 or 41 driving the drive pulley, and the corresponding kinematic chain.

As shown in particular in FIGS. 5 and 6, each half-frame has a parallelepiped shape. Each half-frame is defined longitudinally by upstream and downstream faces 53, 55, transversely by large inner and outer faces 57, 59, and also by upper and lower faces 61, 63. The large inner faces of the two half-frames face one another. The large outer faces face away from the other half-frame.

Upstream and downstream here are to be understood relative to the movement direction of the thermocouple when the latter is inserted into the pipe 5.

Each half-frame 49, 51 includes two housings 65, 67, to receive the connector 7 and the first or second belt 21, 23, respectively.

The housings 65, 67 are open at the lower face 63 and at the large inner face 57. In the usage position, the housings 65 of the two half-frames communicate with one another and are placed transversely facing one another, and the housings 67 are also placed facing one another and communicating with one another.

In the usage position, the respective large inner faces 57 of the half-frames 49 and 51 are positioned across from one another and are practically in contact with one another, only a thin interstice 69 remaining between the two large faces. On the contrary, in the idle position, the respective large inner faces 57 of the half-frames 49 and 51 transversely have a separation from one another of several millimeters, for example about 1 cm, such that it is possible to slide the pipe 5 or the thermocouple 3 between the large inner face 57.

As shown in particular in FIGS. 6 and 7, the half-frames 49 and 51 have substantially the same general shape, and more specifically are symmetrical to one another relative to the contact plane between the large inner faces 57.

For each of the half-frames 49, 51, the housing 65 is situated longitudinally in the downstream direction relative to the housing 67. Thus, the housing 65 is defined toward the downstream face by a mass 71, and is defined in the upstream direction by a partition 73 that separates it from the housing 67. The housing 67 is defined in the downstream direction by the partition 73 and toward the upstream face by a partition 75.

Furthermore, as shown in FIG. 1, the drive pulley 29, the follower pulley 31 and the belt pad 45 are placed inside the housing 67 of the corresponding half-frame. The belt pad 45 is rigidly fastened to the bottom 77 of the housing via screws 5 79. The follower pulley 31 is mounted rotating around an axle 81, oriented substantially perpendicular to the longitudinal direction and the transverse direction. The axle 81 is mounted on the corresponding half-frame via two bearings 83.

FIG. 1 shows that the coupling 7 is arranged in the housings 65, overlapping the two half-frames 49 and 51. It bears longitudinally against the mass 74.

The assembly 1 further comprises guide members 85, guiding the two half-frames 49, 51 in a translational movement between the idle position and the usage position.

In the illustrated example, the assembly 1 comprises two guide members 85, oriented transversely. The members 85 each comprise a smooth axle 87 and a stop 89. The stop is mounted at a first axial end of the axle 87. The end of the axle 87 opposite the stop 89 is rigidly fastened to the half-frame 49. Furthermore, the half-frame 51 includes a smooth hole 91 for each of the guide members 85. The axle 87 is engaged in the smooth hole 91 and is free to slide in the smooth hole 91. The stop 89 limits the translational movement of the half-frame 51 when the latter moves away from the half-frame 49.

Figure 4:
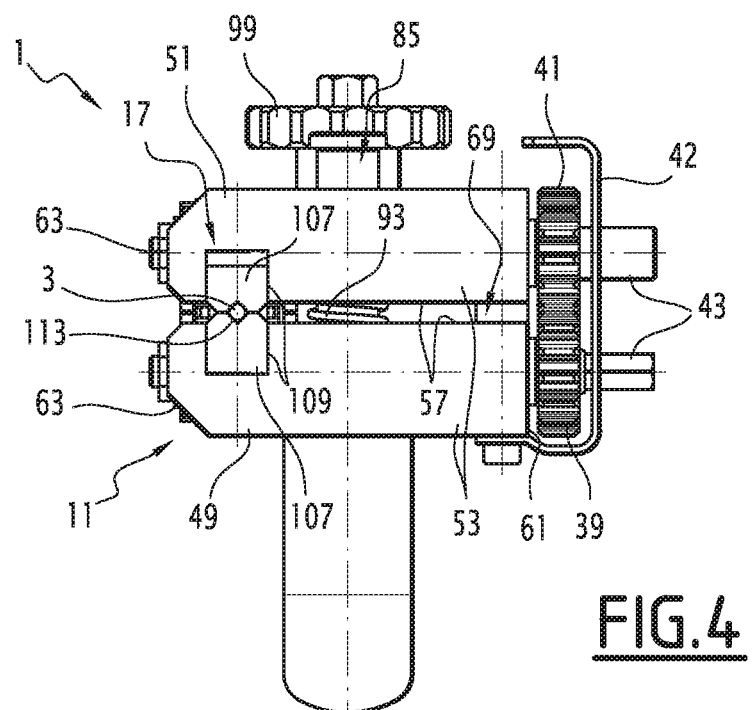
FIG. 4 is a top view of the assembly of FIG. 1.

As shown in FIG. 4, helical compression springs 93 are mounted around each of the axles 87, and are inserted between the half-frames 49 and 51.

The compression springs 93 stress the half-frames 49 and 51 in the direction separating them from one another.

FIG. 4 also shows that the assembly 1 comprises a gripping device 95, provided to stress the two half-frames 49, 51 toward one another in the usage position. This device comprises a rod 97 and a knurled nut 99. The rod 97 has a first end part rigidly fastened to the half-frame 49. It also has a second end part 98, opposite the first, bearing an outer thread, engaged through a smooth hole 101 arranged in the half-frame 51. The knurled nut 99 is mounted on the end of the part 98 protruding outside the smooth hole 101. The knurled nut 99 can thus be screwed on the part 98 of the axle, so as to keep the half-frames 49, 51 in the usage position, against a return force of the springs 93. The position of the knurled nut 99 or its tightening torque also makes it possible to adjust the gripping force with which the belts 21, 23 pinch the thermocouple 3.

The device 15 for blocking the pipe 5 in position relative to the frame comprises two gripping pads 103, each supported by a half-frame 49, 51, suitable for pinching the pipe 5 between them in the usage position of the two half-frames. In the idle position of the half-frames 49, 51, the gripping pads 103 are moved away from one another and release the pipe 5 relative to the frame 11.

Each pad 103 is received in a longitudinal channel 105, arranged in the mass 71 of the corresponding half-frame. The channel 105 emerges at both ends, at the downstream face 55 and in the housing 65. It is open at the large inner face 57. Each 5 gripping pad 103 has a hollow longitudinal cavity, with a section suitable for receiving the pipe 5.

The device 17 for guiding the thermocouple 3 along the passage 13 includes at least two centering pads 107 each supported by a half-frame 49, 51. In the illustrated example, the guide device 17 includes two sets of two centering pads 107, each set including a pad 107 supported by the half-frame 49 and another pad 107 supported by the half-frame 51.

The first set of centering pads 107 is housed in notches 109 arranged in the partitions 75. The notches 109 are open on one side toward the upstream face, on the other side toward the housing 67 and at the large inner faces 57. They are arranged across from one another.

The other set of centering pads 107 is housed in notches 111, arranged in the partition 73. The notches 111 emerge on the one hand in the housing 65 and on the other hand in the housing 67. They are open at the large inner face 57.

The centering pads 107 in a same set bear against one another in the usage position of the half-frames, and define an orifice between them for receiving the thermocouple 3, referenced 113. The orifice 113 has, perpendicular to the longitudinal direction, a section slightly larger than that of the thermocouple 3. The orifices 113 of the two sets of centering pads 107 are longitudinally in the extension of one another, and are in the extension of the pipe 5.

Thus, the passage 13 successively includes the notches 109, the housings 67, the notches 111, and the housings 65.

The method for inserting the thermocouple 3 into the tubular pipe 5 using the above device will now be described.

This method primarily comprises the following steps:
placing the half-frames 49, 51 in the idle position;
placing the thermocouple 3 and the pipe 5 relative to the half-frames 49, 51;
placing the half-frames 49, 51 in the usage position;
activating the motor member so as to drive the thermocouple 3.

To place the half-frames 49, 51 in the idle position, the knurled nut 99 is rotated around the axle 97, in a direction corresponding to the unscrewing. Under the effect of the return force of the elastic members 93, the half-frame 51 moves away from the half-frame 49. It is guided by the guide members 85, such that it remains in an orientation substantially parallel to that of the half-frame 49.

The belt 23 moves away from the belt 21, due to this movement.

The thermocouple 3, in the following step, is placed in the passage 13, and more specifically, is placed between the centering pads 107 housed in the partitions 75, between the belts 21 and 23, and between the centering pads 107 housed in the partitions 73. Furthermore, the pipe 5 is placed between the gripping pads 105, the coupling 7 being placed inside the housing 65. The opening 9 is arranged across from and in the extension of the orifice 113 defined by the pads 107 of the partition 73.

To place the half-frames 49, 51 in the usage position, an operator rotates the knurled screw 99 around the axle 97, so as to bring the half-frames 49, 51 against one another. During this movement, the half-frames are guided by the guide members 85.

At the end of this movement, the pipe 5 is pinched transversely between the two gripping pads 103. The thermocouple 3 is pinched between the first and second belts 21, 23. It is also engaged in the orifices 113 defined by the two sets of centering pads 107.

The operator next activates the motor member, so as to rotate the first and second pinions 39, 41. The rotation direction is chosen so as to drive the thermocouple 3 longitudinally toward the pipe 5. The thermocouple 3 is propelled by the belts 21, 23 and is guided, in particular centered, by the centering pads 107.

The force exerted by the belts is sufficient to overcome the holding power of the thermocouple 3 inside the pipe 5, and, if the movement is stopped, is sufficient to overcome the adhesional force between the thermocouple 3 and the inside of the pipe 5.

The driving force is exerted by the belts over a significant length of the thermocouple 3, such that the force exerted per unit of length of the thermocouple 3 is low enough not to cause marking of the surface of the thermocouple 3.

The motor member is reversible, in that it is also able to rotate the pinions 39, 41 in a direction causing the removal of the thermocouple 3 from the pipe 5. This is particularly advantageous.

Furthermore, the placement of the thermocouple 3 and the pipe 5 in the assembly 1 is particularly convenient, due to the construction of this assembly. The guide members 85 in particular make it possible to guide the movement of the half-frames and ensure precise placement of the thermocouple and the pipe in the gripping pads and between the belts.

The gripping device makes it possible to adjust the gripping force with which the belts pinch the thermocouple.

The centering pads make it possible to guide the thermocouple with precision to the opening 9 of the pipe.

The assembly 1 makes it possible to reduce the time needed to insert a thermocouple into a pipe significantly. With the assembly disclosed herein, the time necessary to completely insert a thermocouple is about 1 min. In the state of the art, with a non-motorized clamp tool, it took several minutes to fully insert a thermocouple.

Furthermore, a single operator is needed to carry out the operation using the assembly 1. Previously, two operators were needed to insert the thermocouple using the non-motorized clamp tool.

In the case of the insertion of a thermocouple intended to measure the temperature in the core of a nuclear reactor, the doses taken in by the operators are considerably reduced, both because only one operator is needed to perform the insertion, and because it takes less time to insert the thermocouple.

What is claimed is:

1. An assembly for the insertion of a thermocouple into a tubular pipe, the assembly comprising:
   a frame having a longitudinal passage for the thermocouple;
   a block configured for blocking the pipe in position relative to the frame;
   a guide configured for guiding the thermocouple along the passage to an opening at the end of the pipe;
   a drive configured for driving the thermocouple longitudinally along the passage relative to the frame, the drive including at least a first drive belt having a first longitudinal segment pressed against the thermocouple, the drive including a motor member driving the first longitudinal segment of the first drive belt longitudinally relative to the frame.

2. The assembly according to claim 1, wherein the drive comprises a second drive belt having a second longitudinal segment pressed against the thermocouple, the motor member driving the second longitudinal segment of the second drive belt longitudinally relative to the frame, the first longitudinal segment and second longitudinal segment being arranged transversely on either side of the thermocouple and pinching the thermocouple between the first longitudinal segment and second longitudinal segment.

3. The assembly according to claim 2, wherein the drive comprises, for each of the first drive belt and the second drive belt, a driving pulley and a follower pulley longitudinally separated from one another, the first drive belt and the second drive belt each being stretched around the corresponding driving pulley and follower pulley and each of the first drive belt and the second drive belt circulating around the corresponding driving pulley and follower pulley.

4. The assembly according to claim 3, wherein the drive comprises, for each of the first drive belt and the second drive belt, a pinion and a kinematic drive chain of the corresponding drive pulley by the pinion, the pinion of the first drive belt meshing with the pinion of the second drive belt.

5. The assembly according to claim 3, wherein the drive comprises, for each of the first drive belt and the second drive belt, a belt pad arranged between the corresponding driving pulley and the follower pulley, the belt pad being arranged so as to stress the corresponding first drive belt or the second drive belt transversely against the thermocouple.

6. The assembly according to claim 2, wherein the frame comprises two half-frames respectively bearing the first drive belt and the second drive belt, the two half-frames being movable relative to one another transversely, between a usage position in which the first drive belt and the second drive belt transversely pinch the thermocouple between the first drive belt and the second drive belt, and an idle position in which the first drive belt and the second drive belt are relatively more separated from one another than in the usage position and allow the placement of the thermocouple between the first drive belt and the second drive belt.

7. The assembly according to claim 6, wherein the assembly comprises guide members guiding the two half-frames in a translational movement between the idle position and the usage position.

8. The assembly according to claim 6, wherein the assembly comprises a gripping device to stress the two half-frames against one another in the usage position.

9. The assembly according to claim 6, wherein the block comprises two gripping pads each supported by one of the two half-frames, the two gripping pads being configured for pinching the pipe between the two gripping pads in the usage position of the two half-frames and releasing the pipe relative to the frame in the idle position of the two half-frames.

10. The assembly according to claim 6, wherein the guide comprises at least two centering pads each supported by one of the two half-frames, the at least two centering pads configured for centering the thermocouple relative to the passage in a plane perpendicular to the longitudinal direction in the usage position of the half-frames and for allowing the thermocouple to be placed in the passage in the idle position of the half-frames.

11. A method for inserting a thermocouple in a tubular pipe using the assembly according to claim 6, the method comprising the following steps:
- placing the two half-frames in the idle position;
- placing the thermocouple and the pipe relative to the two half-frames;
- placing the two half-frames in the usage position; and
- activating the motor member.

* * * * *